Patented Apr. 21, 1931

1,802,296

UNITED STATES PATENT OFFICE

PAUL G. WILLETTS, OF WEST HARTFORD, CONNECTICUT

REFRACTORY

No Drawing.   Application filed November 11, 1926. Serial No. 147,848.

My invention relates to refractories and has special reference to refractories composed mainly of artificial mullite ($3Al_2O_3.2SiO_2$).

One object of my invention is to produce synthetically, by a ceramic process of burning and not by fusion, refractory bodies containing a preponderance of artificial mullite and having a homogenous internal structure in which all identity of the starting materials is destroyed during the burning process.

Another object of my invention is to produce refractory bodies of the above-described kind, containing a previously burned grog which loses all its identity of form in the general mass of the finished product.

A further object of my invention is to produce refractory bodies composed mainly of synthetically produced mullite ($3Al_2O_3.2SiO_2$) with a relatively small amount of glassy matrix, and having a very dense internal structure consisting of innumerable miscropic mullite crystals ceramically produced in a haphazard matted formation bonded by the small amount of glassy matrix and having substantially all of the pore spaces consisting of non-communicating miscroscopic voids enclosed by dense walls, so that the bodies have little or no apparent porosity.

This application is a continuation in part of my copending application for Letters Patent filed March 1, 1926, Serial No. 91,361 and is filed for the purpose of setting forth more particularly the physical and chemical characteristics of the novel products disclosed in my prior application and for the purpose of describing a specific method which may be employed with advantage in practicing my system of manufacturing refractories.

My improved refractory materials whether made from the batches specifically described in my prior application or from the batches described below or from other batches which may be prepared on similar principles, consist mainly of artificial mullite ($3Al_2O_3.2SiO_2$) and a small amount of glassy matrix, and are made essentially by mixing intimately a natural mineral consisting chiefly of hydrated aluminum oxide, such, for example, as diaspore or bauxite, and a natural clay of such composition that the final products will contain aluminum oxide combined with silica in the mullite molecular proportion of three alumina and two silica, with an amount of glassy matrix or slag which depends upon the characteristics and proportions of the starting materials. By the methods herein disclosed, the amount of this glassy matrix can be made much smaller than has heretofore been considered possible. These materials are also characterized by the fact that the mixture of hydrated aluminum oxide mineral and clay is assembled and treated by ceramic methods, and that, when the material is burned to the temperature at which the body matures, the crystalline material mullite can readily be produced in excess of 80%, by weight, of the total solid in the body. These materials are further characterized in that they are produced, by burning from a hydrated aluminum oxide mineral and clay, and are ceramic bodies having a bulk specific gravity not less than 2.5, but which may, by varying the composition, be made as high as 3.0 or even higher. The true specific gravity is never lower than 2.85. The mullite is accompanied by 20% or less of glassy slag, preferably much less, the slag serving as a matrix containing exceedingly small microscopic crystals of mullite. These materials have an apparent porosity, throughout their mass, of less than 2% and a true porosity of less than 10%, the internal voids being non-communicating and enclosed by dense walls so that the material is substantially non-porous in use.

It is further characteristic of these products, as distinguished from other ceramic bodies containing mullite, that the original ingredients disappear entirely in the final products, and are transformed into mullite and the small amount of accompanying slag, without any trace of the original starting materials. The homogeneity of the products is such that softening of the glassy matrix is ineffectual to deform them, and such that chemical solution of the matrix by contact with molten glass is materially slower than the normal rate of solution of prior glass-furnace refractories that have been produced heretofore by ceramic methods.

A specific example of batch set forth in my prior application mentioned above, includes raw aluminum hydrate mineral, calcined aluminum hydrate material, calcined silicious clay and an additional clay of such composition as to provide the desired ratio of alumina to silica. A simpler and equally effective batch mixture consists of two ingredients only, namely, an aluminum hydrate mineral, suitably diaspore or bauxite, and a single silicious clay of suitable composition to give the desired ratio of alumina to silica in the final products. For this purpose I may employ Grossalmerode German clay, or a fine grained silicious clay from Ouachita County, Arkansas, described as No. 23 on pages 24 and 25 of Technologic Paper No. 144 of the U. S. Bureau of Standards, Jan. 28, 1920. When the latter clay is employed, the batch mixture may consist of 80 parts of diaspore and 20 parts of the silicious clay, although these proportions may be varied considerably.

The two raw materials, diaspore and clay, are ground to as great a degree of fineness as is practicable, suitably to such fineness as to pass through a 325-mesh screen. Even finer subdivision is of advantage, as one of the most important features of my invention is the intimate mixing of the ingredients so as to bring their particles into close contact to favor the subsequent reaction.

The finely divided materials are mixed in the proportions stated, or in such other proportions as may be desired, under such conditions as to promote their intimate mixture with each other. For this purpose, it is important that water be used at some stage of the mixing process. The diaspore takes up water readily and the water carries with it into intimate contact with the diaspore a considerable proportion of the silica content of the clay, much of which is in free colloidal condition.

The mixing methods set forth in my prior application are well suited for this purpose. They include the mixing of the dry materials with water to form a slip, agitating the slip in a blunger, filter-pressing the slip and pugging the press-cake.

However, another and simpler mixing process is entirely suitable for my present purposes. According to this simpler process, the finely ground starting materials are mixed dry and water is added, suitably in the proportion of about 30% by weight of the mixed materials. This mixture is passed one or more times through a pug mill. The dry starting materials may be mixed together in the dry state and charged into the pug mill, the water being run into the pug mill at the same time.

The pugged material is divided into fragments suitable for handling, and is allowed to dry, according to ordinary ceramic drying practice, until most of the free water evaporates off. Then the material is calcined in a kiln to a temperature below the melting point of crystalline mullite, but sufficient to mature the material, and produce artificial mullite with a small amount of accompanying slag. Such a temperature is suitably cone 31, corresponding to a temperature of 3182° F.

The burned material is broken down to suitable fineness to serve as grog for a final assembly, such fineness being about 12-mesh, more or less. The grog thus produced is mixed with an additional quantity of the dry starting materials, the starting materials being preferably mixed for this purpose in the same proportions in which they were used to form the grog batch. About 50% of grog and about 50% of additional raw starting material may be used. These proportions may be varied considerably according to the particular characteristics to be imparted to the final materials.

After the grog and the additional raw starting materials are mixed together in a dry state, sufficient water is added for dry pressing. Such amount of water may be about 6% by weight of the dry assembled materials, although this amount of water may be increased or decreased somewhat. It should not exceed 12% for best results.

The assembled material is then dry-pressed into the final shapes desired, such as tank blocks for glass furnaces, tiles for regenerator checker work, or any other desired refractory shapes. These final shapes are then fired in a kiln at a sufficiently elevated temperature to mature the added raw material, such temperature being suitably about cone 30 corresponding to 3146° F. During this final burning, the added starting materials are completely transformed to material of the same composition and structure as the grog material, so that it is not possible in the final product to distinguish between the grog material and the added material.

I believe that I am the first to produce dry-pressed tank blocks for glass furnaces, and I have found that such dry-pressed blocks are superior to blocks made from similar materials by wet methods, in respect to their resistance to penetration by molten glass and in respect to their effective life in service. Therefore, I prefer to employ the above-described dry-pressing process for forming tank blocks and other refractory articles. However, other well-known ceramic methods may be employed if desired, such as wet-molding or casting from slip. Products made by these wet methods exhibit greater shrinkage during the final burning than dry-pressed products, and have less bulk specific gravity.

While I prefer to employ a natural aluminous mineral as a starting material in making the refractory bodies described above, it is possible to use purified aluminous material in place of some or all of the mineral.

The properties of the final products may be controlled by varying the proportions of the starting materials. The amount of slag is largely dependent on the amount of alkaline, alkaline earth and metallic impurities in the raw materials; and also on the amount of excess silica that is present above that necessary to produce mullite. The glassy matrix or slag is derived from such parts of the aluminous mineral and clay, used as the starting materials, as do not react to form crystalline aluminum silicate. By varying the amounts of impurities and silica, therefore, the relative amounts of slag and mullite may be controlled. Also, the true specific gravity of the products may be varied by changing the proportion of alumina in the batch composition.

Chemical and physical examination of the products produced as described above, and of the products produced as described in my prior application Serial No. 91,361, discloses that these materials are composed mainly of artificial mullite ($3Al_2O_3.2SiO_2$) and a small amount of glassy slag which serves as a matrix for the mullite. The mullite can readily be made to be present in at least 80% by weight and the glassy matrix in less than 20% by weight, although these proportions, as indicated above, may be varied by suitably changing the proportions and the degree of purity of the starting materials. The ceramic production of bodies containing this unusually large amount of mullite in homogeneous mixture with glassy slag is believed to be novel with the present invention.

The internal structure of these products is exceedingly dense and homogeneous and consists of innumerable microscopic mullite crystals, of an average estimated size of 0.05 mm. to 0.10 mm. in length, in a haphazard matted formation bonded by the small amount of glassy matrix. There are no visible voids, and the microscopic voids are very small and non-communicating, being enclosed by dense walls. The apparent porosity of the products is less than 2% and its true porosity is less than 10%. The structure is novel and highly advantageous.

The glassy matrix which accompanies the mullite in these products contains less than 15% of alkali metal oxides and alkaline earth metal oxides and at least 80% of silica, and is therefore exceedingly viscous and refractory.

It is characteristic of these materials that they are produced by ceramic methods without the addition of any alkaline fluxing agent and without fusing the ingredients together. It is also characteristic of these materials that when they are made into rectangular blocks, and these blocks are fired according to the method described herein, the material deforms so slightly that the angles between the adjacent faces of the blocks remain 90° within a tolerance of accuracy of plus or minus five minutes. The slight shrinkage which occurs in the final burning of such blocks tends to be least at the lower ends of the blocks upon which they rest during burning. This unequal dimensional change can be controlled, and the angles at the lower ends of the blocks made normal within the tolerance stated, by the methods described in my Letters Patent No. 1,626,260 and No. 1,626,261, granted to Hartford-Empire Company on April 26, 1927.

According to the method described in Patent No. 1,626,260, a block of equal dimensions is produced by placing the block for firing upon a support of material such, for example, as material similar to the raw grog entering into the composition of the block itself, which material, during the firing operation, will shrink at least as much as the block, and then firing the block and the support to a temperature which would tend to produce unequal dimensional change if the block were fired on a rigid support.

According to the method described in Patent No. 1,626,261, a block of equal dimensions is produced by making one of the faces of the block smaller than the opposite face, and firing the block with its smaller face resting upon a rigid support. The unequal dimensions given to the block before firing are so selected that the unequal shrinkage in the block during firing will bring the block to equal dimensions when the firing is completed.

The following features of this invention are pointed out as being novel in this art:

First, that I may produce, by this invention, ceramic products containing 80% or more of mullite ($3Al_2O_3.2SiO_2$);

Second, that complete chemical transformation is accomplished by a process of burning the molded shapes without deformation, rather than by fusion to a liquid, chilling, grinding and bonding the product;

Third, that the completed product will retain its original shape to a high degree during the burning process;

Fourth, that the pore space of the body is essentially all composed of enclosed pores of very small size, surrounded by dense walls, thus rendering the body substantially non-porous when in use;

Fifth, that the crystalline portions and the glassy portions of the finished body are intermixed in a thoroughly homogenous manner, such that softening of the glassy portion is ineffectual in causing deformation of the body, and such that chemical solution of the glassy portion in a glass melting furnace is exceptionally slow, owing to the inability of the hot solvent glass to come in contact with any appreciable quantity of the matrix;

Sixth, that the glassy matrix is of such composition that its softening point is comparatively very high;

Seventh, that the products have a bulk density greater than 2.50, and are therefore heavier than ordinary soda lime glass, so that these products are well suited to the glass furnace construction described and claimed in my U. S. Patent No. 1,605,885, granted November 2, 1926;

Eighth, that the body is produced by burning a mixture of ceramic materials so that all identity of the raw materials is lost and a new crystalline compound is produced in a glassy matrix, and Ninth, that the identity of grog particles is lost in the general mass.

Actual tests in service of the refractory materials described above show that they have exceedingly long life in contact with molten glass, and that as they wear away, the wear is very even. They lend themselves well to use in insulated glass furnaces, which have not heretofore been considered practical on account of the inability of prior refractories to withstand the severe conditions existing in insulated furnaces.

In the present specification and in the appended claims, the words "ceramic" and "ceramically produced" are intended to indicate that this invention is restricted to the art of fabricating articles by molding and baking clays and analogous substances without general fusion and without the presence of so much fluxing agents as would produce porcelain bodies. It is also to be understood that the expression "ceramically produced mullite" means crystalline aluminum silicate produced in situ in a body undergoing ceramic treatment not involving general fusion of the body.

I claim as my invention:

1. The method of making refractory bodies composed mainly of ceramically produced artificial mullite ($3Al_2O_3.2SiO_2$) in homogenous combination with a relatively small amount of glassy matrix, and having a dense internal structure, which comprises the steps of grinding a natural mineral containing hydrated aluminum oxide to impalpable fineness, grinding a natural silicious clay to impalpable fineness, the fineness of such grinding being such as to enable said ingredients to combine with substantial homogeneity, intimately mixing said ingredients in selected proportions and in the presence of water, burning the mixed materials to a temperature sufficient to cause said silicious and aluminous material to combine ceramically to produce mullite ($3Al_2O_3.2SiO_2$), reducing the resulting material to sufficient fineness to form a grog, assembling said grog with additional mixed raw material similar to that from which said grog was made, to provide a dry mass insufficiently plastic to be molded by ordinary wet molding methods, forming the said assembled materials into the final shapes desired by dry pressing, and firing the articles so produced to a temperature sufficient to cause the added silicious and aluminous material to combine to produce mullite ($3Al_2O_3.2SiO_2$) and to destroy the identity of the original starting materials.

2. The method of making refractory bodies composed mainly of ceramically produced mullite ($3Al_2O_3.2SiO_2$) in homogeneous combination with a relatively small amount of glassy matrix and having a dense internal structure, which comprise the steps of reducing to impalpable fineness a natural mineral composed mainly of hydrated aluminum oxide, and a natural clay, mixing the said ground ingredients in selected proportions and in the presence of water, forming the mixed material into articles suitable for handling, drying the said articles, burning the said articles to a temperature sufficient to cause the said clay and aluminous mineral to combine with the production of the said mullite and glassy matrix, breaking down the said material to such fineness as to form a grog for a subsequent final assembly, adding to the said grog a selected proportion of the original mixed starting materials, forming the said assembled material into the final shapes desired, with sufficient water for dry-pressing, dry-pressing the mixture into the final shapes and burning the said shapes at a temperature sufficient to cause the added starting materials to react with production of said mullite and said glassy matrix, in substantially the same proportions as the said mullite and matrix exist in the said grog, thereby producing a final product in which the starting materials have disappeared and the said grog has lost its identity of form in the general mass and in which the said mullite and glassy matrix exist in homogeneous combination with a fine-grained and dense internal structure containing microscopic voids enclosed by dense walls, and consisting of innumerable microscopic crystals of mullite in a haphazard matted formation bonded by the small amount of glassy matrix.

3. The process of producing ceramic refractory articles which comprises, grinding aluminous and silicious mineral material to exceeding fineness to cause the ingredients of the mineral to combine with substantial homogeneity, forming the material into bodies suitable for handling, firing the said bodies to a sufficiently high temperature to produce material having substantially the same chemical and physical characteristics as the finished body, crushing the material to granular form for grog to be used in making a final assembly, making such final assembly by mixing said granular material with additional unburned aluminous and silicious mineral material ground to exceeding fineness and of substantially the same chemical composition as the grog, molding the said final assembly into articles, and firing to a temperature in excess of 2700° F. and sufficiently high to produce articles containing aluminous crystals, and which articles are characterized by uniformity in chemical and physical structure, and high mechanical strength resulting from the destruction of the identity of the orginal starting materials.

4. A process according to claim 3 wherein the aluminous and silicious mineral material for the grog, and the unburned aluminous and silicious material mixed with the grog for the final assembly, are ground to a fineness of the order of 325 mesh, and the final assembly is molded into articles by dry pressing.

5. The process of making tank blocks and like refractory articles for use in contact with molten glass, which comprises grinding aluminous and silicious mineral material to exceeding fineness, to cause the ingredients of the material to combine with substantial homogeneity, forming the material into bodies suitable for handling, calcining the said bodies to a sufficiently high temperature to produce a material having substantially the same chemical and physical characteristics as the finished body, grinding the calcined bodies to granular form for grog to be used in a final assembly, making said final assembly by mixing said calcined granular material with additional unburned aluminous and silicious mineral material ground to exceeding fineness and of substantially the same chemical composition as the grog, molding the said final assembly into blocks, and firing the blocks to a temperature in excess of 2700° F. and sufficiently high to transform the blocks to such a homogeneous condition that the identity of the original starting materials is completely destroyed, and blocks are produced which are characterized by their low void structure, high mechanical strength, and high resistance to the corrosive and erosive action of molten glass, and which wear away evenly when used in contact with molten glass.

6. A process according to claim 5 which comprises mixing the ingredients for the final assembly to provide a dry, substantially non-plastic mass, and molding the mass into tank blocks by dry pressing.

7. A process according to claim 5 which comprises, grinding the aluminous and silicious mineral material from which the grog is made and the unburned aluminous and silicious mineral material mixed with the grog for the final assembly, to a fineness of the order of 325 mesh, and molding the assembly into tank blocks by dry pressing.

8. The process of producing ceramic refractory articles containing at least 50% alumina on analysis, which comprises, grinding aluminous and silicious mineral material containing at least 50% alumina to impalpable fineness, to cause the ingredients of the material to combine with substantial homogeneity, forming the material into bodies suitable for handling, calcining the said bodies to a temperature at least as high as the firing temperature of the finally assembled body to produce material having substantially the same chemical and physical characteristics as the finished body, crushing the calcined bodies to granular form for a final assembly, making said final assembly by mixing said calcined granular material with additional aluminous and silicious mineral material ground to impalpable fineness and of substantially the same chemical composition as the grog, to provide a dry mass insufficiently plastic to be molded by ordinary wet molding methods, dry pressing the mass into articles, and firing the articles to a temperature below the melting point of mullite but sufficiently high to completely vitrify the articles and to merge the identity of the original starting materials, and to transform said materials into crystals of microscopic size mixed homogeneously with glass.

Signed at Hartford, Conn., this 9th day of November, 1926.

PAUL G. WILLETTS.